April 14, 1959  C. RUDINE  2,881,960
PILL COUNTING AND DISPENSING DEVICE
Filed Oct. 26, 1956  2 Sheets-Sheet 1
FIG_1
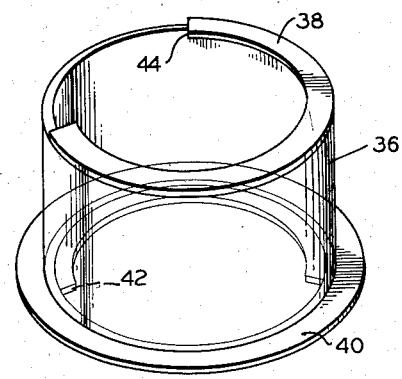
FIG_2
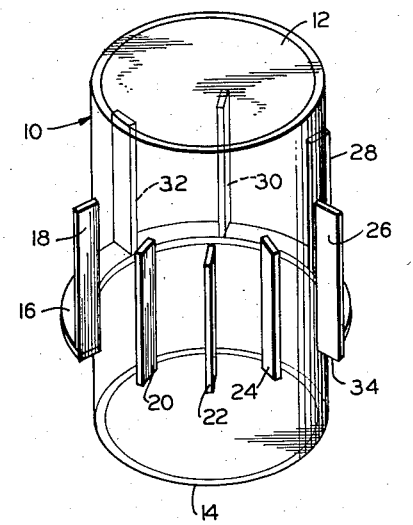
FIG_3
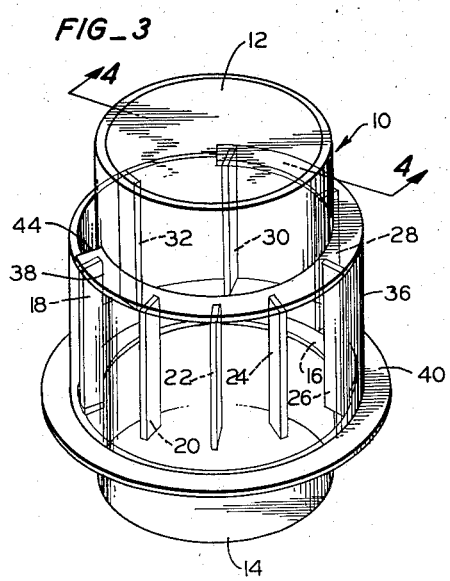
FIG_4
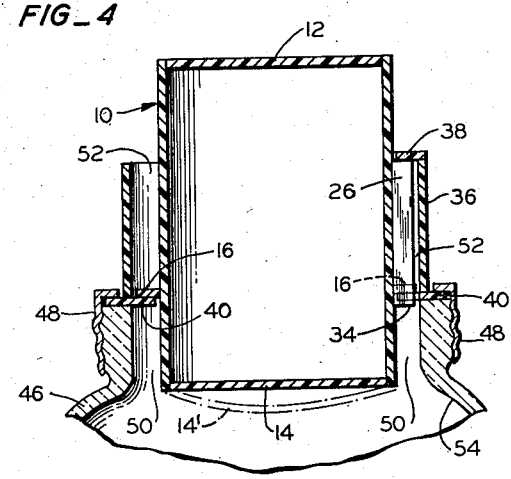
INVENTOR.
CLIFFORD RUDINE
BY
ATTORNEYS April 14, 1959 C. RUDINE 2,881,960
PILL COUNTING AND DISPENSING DEVICE
Filed Oct. 26, 1956 2 Sheets-Sheet 2
FIG_5
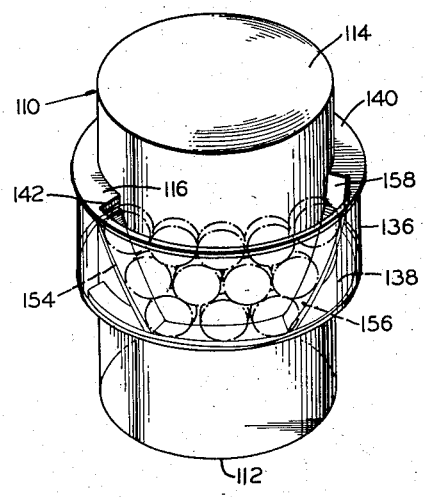
FIG_8
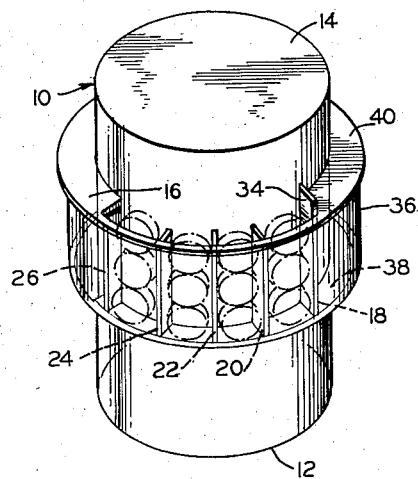
FIG_6
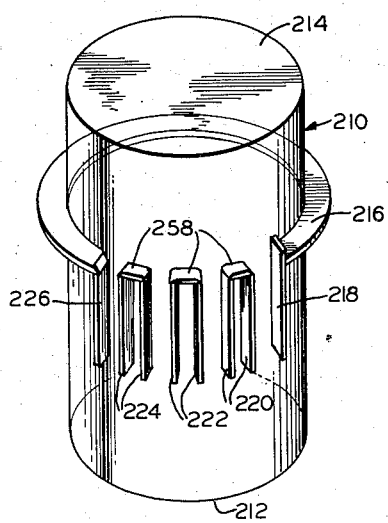
FIG_7
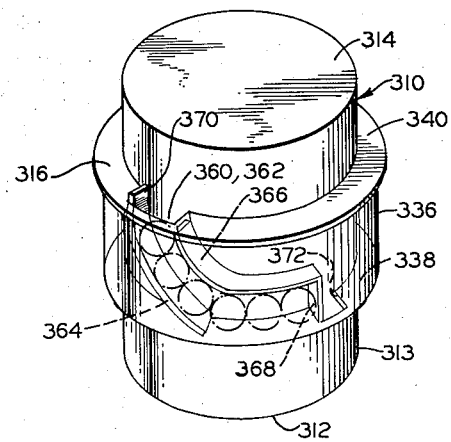
INVENTOR.
CLIFFORD RUDINE
BY
*Naylor & Neal*
ATTORNEYS

United States Patent Office 2,881,960
Patented Apr. 14, 1959

2,881,960

PILL COUNTING AND DISPENSING DEVICE

Clifford Rudine, San Francisco, Calif.

Application October 26, 1956, Serial No. 618,581

8 Claims. (Cl. 222—370)

This invention relates to a device for counting and dispensing various types of pharmaceutical pills.

The conventionally followed procedure of manually counting pills is time consuming, laborious and subject to human error.

It is therefore the principal object of the present invention to provide a mechanical appliance that will rapidly and accurately count pharmaceutical pills to be dispensed into appropriate sized bottles or boxes for retail distribution. Another object of the invention is to provide an appliance which is adapted to rearrange the irregular mass pattern of the pills in the container into a uniform pattern so that they may pass through one or more apertures into chambers of measured capacity for the purpose of being accurately counted and dispensed into smaller suitable containers for appropriate distribution.

A further object of the invention is to provide a pill counter which makes it possible for pills to be dispensed without being touched by the hands of the one dispensing them.

Still a further object of the invention is to provide an appliance of the type mentioned which is simple in design, durable in construction, easy to operate, and inexpensive to manufacture.

The present invention contemplates the fabrication of the appliance in transparent plastic or in transparent plastic in combination with other suitable materials.

The present invention further contemplates an individual appliance to be attached to each conventional pharmaceutical supply bottle or like suitable container. An attaching device is provided to secure the appliance of the invention to the container. The attachment and container are necessary adjuncts to the workability of the appliance of the invention, but do not per se constitute essential parts of the invention.

These and other objects of the invention will be apparent from the following description taken in conjunction with the drawings forming a part of this specification, and in which:

Figure 1 is a view in perspective of the outer cylinder-like unit of one form of appliance of the invention;

Figure 2 is a view in perspective of the inner cylinder-like unit of said one form of appliance;

Figure 3 is a view in perspective of the pill counting and dispensing appliance resulting from the assembly of the units in Figures 1 and 2;

Figure 4 is a view in section taken along lines 4—4 of Figure 3, with the neck of the pill container and the means for attaching the appliance to the container being also shown;

Figure 5 is a view in perspective of a modified form of the pill counting and dispensing appliance of the invention;

Figure 6 is a view in perspective of a further modification of the subject appliance, with only the inner cylinder-like unit being shown;

Figure 7 is a view in perspective of a further modification of the subject appliance, and Figure 8 is a view in perspective of another modification of the subject appliance, showing in dotted outline pills disposed in groups of like number for counting.

With reference to Figures 1-4, the pill counting dispenser therein shown comprises an inner cylinder 10 having top and bottom ends 12 and 14, a semi-annular ring 16 secured thereto, and a plurality of vertically elongated and radially directed rib members 18—32. The upper ends of these rib members are disposed in a common plane, and the lower ends of said members, except for rib members 26, are likewise disposed in a common plane, i.e., the plane occupied by the upper surface of semi-annular ring 16. The lower end 34 of rib member 26 extends below ring 16. A prototype of the unit of Figure 2 was formed of transparent plastic by adhesively securing the end walls 14 and 15, ring 16, and ribs 18—32 to a hollow open-ended cylinder.

The outer cylinder-like unit shown separately in Figure 1 comprises a hollow open-ended cylinder 36, a semi-annular flange 38 secured to the upper end thereof, and an annular flange 40 secured to the lower end thereof, said flange 40 having an arcuate slot 42 formed in its inner periphery. A prototype of the unit of Figure 1 was formed of transparent plastic by adhesively securing the semi-annular ring 38 and the annular flange 40 to opposite ends of the cylinder 36.

Figure 3 illustrates the units of Figure 1 and Figure 2 in assembled relation. This assembly may be conveniently achieved by dropping the unit of Figure 2 downwardly into the unit of Figure 1 before the semi-annular ring 38 is made a part of the latter. The under side of semi-annular ring 16 then rests on the upper side of flange 40. The outer diameter of ring 16 is slightly less than the inner diameter of cylinder 36 and the outer diameter of cylinder 10 is slightly less than the inner diameters of ring 38 and flange 40. When the unit of Figure 2 has been disposed within the unit of Figure 1, the semi-annular ring 38 is attached to cylinder 36, thereby serving as a stop member with relation to the upper ends of rib members 18—32 to prevent endwise removal of the unit of Figure 2 from that of Figure 1. The inner unit may be rotated relative to the outer unit a distance equal to the arcuate length of slot 42 formed in flange 40, the depending lower end 34 of rib 26 serving to limit rotative movement of the two units to this arcuate distance by engaging first one and then the other end of slot 42. Slot 42 has an arcuate length equal to the portion of ring 16 which has been removed to make it semi-annular in form, and the arcuate length of slot 42 is likewise equal to that of the portion of ring 38 which has been removed to make it semi-annularly formed. The end 44 of semi-annular ring 38 is disposed substantially directly above one end of slot 42.

When the inner and outer units are disposed in the position of Figure 3, i.e., with the depending end 34 of rib 26 in abutting relation with the righthand edge of slot 42, a semi-annular chamber which is open at the bottom and closed at the top and the sides is defined between the cylinders 10 and 36, ribs 18 and 26, and semi-annular ring 38. This chamber may be termed the input chamber. It is open at the bottom because of the coincidence of slot 42 and the gap in ring 16.

When the inner unit is rotated in a clockwise direction (Figure 3) relative to the outer unit to the point where the depending end 34 of rib 26 engages the left edge of slot 42, a semi-annular chamber which is closed at the bottom and open at the top is defined between the cylinders 10 and 36, ribs 18 and 26, and flange 40. This chamber may be termed the output chamber. The gap in ring 38 defines the open top of this chamber. Both the input and output chambers are divided into four sub-chambers, or compartments, of equal size by the ribs 20, 22 and 24.

The ribs 28, 30 and 32 play no part as far as the operation of the appliance is concerned. These ribs serve as spacer members between the cylinders 10 and 36 and they prevent endwise disengagement of the inner and outer units when the ribs 18—26 are disposed in the output chamber position.

In Figure 4 the appliance is shown as being disposed in secured relation to the neck of a container 46 of the type conventionally used as a shelf storage container for a relatively large number of pills. Clamp ring 48 threadably engages with the neck of the container to secure flange 40 against the top thereof. The lower edge of the inner unit extends within the neck of the container to define therewith annular space 50. Since the inside surface of cylinder 10 is in alignment with the inside surface of the neck of the container, the width of the annular space 50 is equal to the width of the annular space 52 defined between cylinders 10 and 36.

The appliance of Figures 1–4 is particularly adapted for the counting and dispensing of tablet-type pills, such as aspirin tablets. When the appliance is to be used for the counting and dispensing of aspirin tablets, the appliance is dimensioned as follows: Annular spaces 50 and 52 have a width equal to one and one-fourth times the thickness of an aspirin tablet. The distance between each of the rib pairs 18—20, 20—22, 22—24 and 24—26 is very slightly in excess of the diametral dimension of an aspirin tablet, and the distance between the semi-annular rings 16 and 38 is just slightly in excess of three times the diametral dimension of an aspirin tablet. Thus, both the input and output chambers of the appliance may readily accommodate 12 aspirin tablets, i.e., four rows of three tablets each.

The appliance is operated in the following manner: First, the inner unit is rotated relative to the outer unit to dispose the input chamber in full communication with the annular space 50. The container 46 is then inverted to cause the tablets therein to gravitate downwardly toward annular space 50 and through said space and into the input chamber of the appliance. One or two gentle shakes imparted to the container are sufficient to insure that the desired 12 tablets will be deposited within the input chamber. The curvature, or angularity, of the inner surface 54 of the container tends to cause the tablets to slide edge-wise into space 50, and the plurality of sub-compartments defined within the input chamber allows for the proper feeding of the tablets into said chamber, i.e., minimizes any tendency of two or more tablets to contest for entry into a sub-compartment and thereby lock them out of the sub-compartment. The orientation of the tablets being sent into space 50 may be enhanced by making the bottom wall of the inner unit of the appliance convex in form, as indicated at 14′ in Figure 4. Surfaces 14′ and 54 acting together tend to funnel the tablets edge-wise into space 50.

When the operator of the appliance perceives that the input chamber is fully occupied by the tablets, he then rotates the inner unit, while still maintaining the container and appliance in inverted position, to move the tablets into the output chamber. The tablets drop out of the appliance through the gap in semi-annular ring 38. As this movement of the inner unit takes place, semi-annular ring 16 progressively closes slot 42 to prevent other tablets within the annular space 50 from moving into the appliance. Each time this dispensing operation takes place, a pre-determined number of tablets are dispensed from the appliance. The dispensed tablets are thereby, in effect, counted. If the operator wishes to count out, for example, 60 tablets to fill a customer's order, he merely goes through the described dispensing operation five times. The outer cylinder 36 is made of translucent material, such as clear plastic, so that the operator may tell at a glance whether the input compartment is fully occupied by the tablets, i.e., whether the "count" is correct.

Figure 8 is another view of the specific appliance of Figures 1–4, with the same being shown in inverted position, and with the four rows of three tablets each being shown in dotted outline within the input chamber. It will be clear then that when the inner unit is rotated in a clockwise direction with respect to the outer unit, the tablets will gravitate out of the appliance through the gap defined in the semi-annular ring 38. It will be appreciated that the appliance, as shown in Figure 8, is shown separate and apart from container 46.

Figure 5 is a view corresponding to that of Figure 8, but showing a modified form of the appliance. Those parts of the appliance of Figure 5 which are the same as those of Figures 1–4 and 8 are identified by the same reference numbers plus 100. The sole differences between the appliances of Figures 5 and 8 consist of the following: Both the slot 142 formed in flange 140 and the gap formed in semi-annular ring 116 are dimensioned to accommodate five tablets abreast instead of four; the gap formed in semi-annular ring 138 is dimensioned to accommodate three tablets abreast instead of four; and a pair of angularly inclined rib members 154 and 156 are utilized in place of the five vertically directed and parallel rib members 18—26. Rib member 156 is provided with an extended end 158 which selectively engages the end edges of slot 142 to limit relative rotative movement between the inner and outer units of the appliance.

When the appliance of Figure 5 is connected to the pill container and the container is inverted, 12 tablets again move downwardly from the container into the input chamber, as is indicated in dotted outline in Figure 5. The tablets pile up on the semi-annular ring 138 in rows of three, four and five tablets each due to the angular disposition of two rib members 154 and 156. Clockwise rotative movement of the inner unit of the appliance moves the ribs 154 and 156 to the output chamber-defining position where the tablets drop out of the appliance to the gap formed in semi-annular ring 138.

A modified form of the inner unit only of the appliance which is specifically adapted for the counting and dispensing of capsule-type pills is illustrated in Figure 6. This inner unit, which is shown in inverted position, consists of a hollow cylinder 210 having end walls 212 and 214, a semi-annular ring 216 secured to the cylinder, rib pairs 220, 222 and 224, the upper ends of which are bridged by members 258 having arcuately shaped upper surfaces, and ribs 218 and 226. The sub-compartments defined in part by rib 218 and the right rib of the rib pair 220, the left rib 220 and the right rib 222, the left rib 222 and the right rib 224, and the left rib 224 and rib 226 are adapted to receive in endwise fashion the capsules from the container. These sub-compartments are slightly wider than the diametral dimension of the capsules and have a length equal to slightly more than three times the length of the capsule. Each sub-compartment may therefore contain three capsules arranged in vertically disposed end-to-end relation, with the bottommost capsule in each sub-compartment being supported on the semi-annular ring, not shown, corresponding to rings 38 and 138 in the previously described embodiments of the outer units of the appliance. The bevelled contour of bridge members 258 promotes the movement of the capsules from the container into the sub-compartment in edgewise fashion. When the inner unit of Figure 6 is moved in a clockwise direction relative to the outer unit, not shown, the capsules within the sub-compartment drop out of the gap formed in the ring portion of the outer unit corresponding to the semi-annular ring portions 38 and 138 of the previously described embodiments.

Figure 7 shows a further modification of the subject appliance, the same being shown in inverted position. It will be seen that pills from the container, not shown, pass downwardly through the aligned slots 360 and 362 formed, respectively, in ring member 340, which is secured to the outer cylinder 336, and ring member 316, which is secured to the inner cylinder 310. The pills travel downwardly through an arcuate chute defined by ribs 364 and 366, which are carried by the inner cylinder 310, and ring 338 which is carried by the outer cylinder 336. This chute is dead-ended by rib member 368 which is secured to the inner cylinder 310 in depending relation from the end of rib 366.

The pill chute is dimensioned to contain a single row of a predetermined number of pills, such as six pills, as shown in Figure 7. This particular embodiment of the invention is particularly adapted for the counting and dispensing of spherical pills, or pills which will readily roll from a plurality of axes of rotation. When the inner unit is rotated in a counterclockwise direction relative to the outer unit to the point where the protruding upper end 370 of rib 364 engages the opposite side of the slot 360 formed in ring 340, rib 368 will have moved across slot 372 formed in ring 338 to bring the pill chute in communication with said slot 372. The pills then roll out of the appliance, where they are aided in doing so by tilting the appliance so that the pills will roll along ring 338 and drop downwardly through slot 372.

While a number of embodiments of the invention have been shown and described, it is to be understood that all substantial equivalents thereof are considered to be within the spirit of the invention and the scope of the appended claims.

What is claimed is:

1. A device of the type described comprising an inner cylindrical member, an outer cylindrical member, means securing said members together in concentric relation for rotative movement with respect to each other, said means comprising upper and lower inwardly directed ring members fixedly secured to said outer cylindrical member, an outwardly directed ring member fixedly secured to said inner cylindrical member and disposed in engagement with and supported by said lower ring member, a plurality of rib members secured to said inner member and defining with said inner and outer members and with said upper and said outwardly directed rings a pill receiving compartment, a first opening formed in said outwardly directed ring providing for communication with said compartment, a second opening formed in said lower ring adapted when disposed in registry with said first opening to enable pills to be introduced into said compartment, and a third opening formed in said upper ring in angularly offset relation with respect to said second opening adapted when said first and second openings are disposed fully out of registry with each other to permit pills to be removed therethrough from said compartment.

2. A device of the class described comprising a first cylindrical member, a second cylindrical member disposed in outwardly spaced concentric relation with respect to said first member, a pair of spaced parallel ring members fixedly secured to one of said cylindrical members and extending to the other of said cylindrical members to define in conjunction with said cylindrical members an annular chamber, an opening formed in each of said ring members, said openings being angularly offset and fully out of registry with each other, another ring member carried by the other of said cylindrical members, said latter ring member being disposed immediately adjacent one of said pair of ring members and extending across said annular chamber, an opening formed in said latter ring member adapted to be selectively moved into and out of registry with the opening formed in the ring member disposed immediately adjacent thereto by rotative movement of one of said cylindrical members with respect to the other, and article receiving and conveying means disposed within said chamber, said means being secured to one of said cylindrical members and being adapted when the openings of said adjacent rings are in registry to receive articles passed through said openings and to prevent said articles from passing out of said chamber through the opening formed in the other of said pair of ring members, said means being further adapted when said openings are moved out of registry to convey said articles to a position where they may pass out of said chamber through the opening formed in the other of said pair of ring members.

3. The device of claim 2, said article receiving and conveying means being adapted to contain a predetermined whole number of articles of like shape and size, and said device being formed of transparent material to the extent necessary to permit the determination of whether or not said article receiving and conveying means is occupied by said predetermined whole number of articles.

4. The device of claim 3 in combination with means for removably securing the same in closing relation with the neck of a container for said articles without preventing relative rotative movement between said cylindrical members.

5. The device of claim 3 in combination with a container adapted to hold a plurality of said articles, and means for removably securing said device in closing relation with the upper end of said container, said inner cylindrical member extending downwardly within the neck of said container concentrically thereof to define therebetween an annular space which is in alignment with said annular chamber.

6. A pill dispenser adapted to be secured to a pill container and to dispense therefrom a predetermined number of pills each time said dispenser is operated comprising concentrically disposed inner and outer cylindrical members defining therebetween an annular space, means interconnecting said members together while permitting rotative movement of one with respect to the other comprising upper and lower ring members secured to said outer member in subtending relation to said annular space, a pill inlet and a pill outlet opening formed, respectively, in said lower and upper ring members, said openings being offset with respect to each other, an intermediate ring member secured to said inner member in subtending relation to said annular space and disposed in engagement with said lower ring member, an opening formed in said intermediate ring member adapted upon rotative movement in one direction of said inner member to be disposed in registry with said pill inlet opening and upon rotative movement in the other direction of said inner member to be disposed out of registry with said inlet opening, and means carried by said inner member defining a pill receiving chamber within said annular space, said means being positioned to selectively dispose said chamber in communication with said inlet opening through said intermediate ring member opening and out of communication with said outlet opening and to dispose said chamber in communication with said outlet opening and out of communication with said inlet opening.

7. A device for the counting-dispensing of alike shaped and sized and symmetrically formed articles, said device being adapted to be attached to a container in which a large number of said articles are normally disposed, said device comprising means defining a chamber having an inlet and an outlet opening, movable means for selectively opening and closing said inlet opening, article receiving and conveying means movably disposed within said chamber adapted to receive a predetermined plurality of said articles through said inlet opening and to have said plurality of articles uniformly oriented therein, and means for moving said receiving and conveying means out of communication with said inlet opening and into communication with said outlet opening to effect simultaneous movement of said plurality of articles toward said outlet opening, both said inlet and said outlet opening having, respectively, article receiving and article discharge dimensions which are equal to whole number integers of the dimensions of said articles taken transversely of the direction of movement of said articles through said receiving and conveying means.

8. A device for the counting-dispensing of alike shaped and sized, symmetrically formed, and larger than particle-sized articles, said device being adapted to be attached to a container in which a large number of said articles are normally disposed, said device comprising means defining a chamber having in inlet and an outlet opening, means disposed at the entranceway to said chamber to prevent jamming of said articles and enable them to be oriented for smooth travel into said chamber, movable means for selectively opening and closing said inlet opening, article receiving and conveying means movably disposed within said chamber adapted to receive a predetermined plurality of said articles through said inlet opening and to have said plurality of articles uniformly oriented therein, and means for moving said receiving and conveying means out of communication with said inlet opening and into communication with said outlet opening to effect simultaneous movement of said plurality of articles toward said outlet opening, both said inlet and said outlet openings having, respectively, article receiving and article discharge dimensions which are equal to whole number integers of the dimensions of said articles taken transversely of the direction of movement of said articles through said receiving and conveying means.

References Cited in the file of this patent
UNITED STATES PATENTS

| | | |
|---|---|---|
| 2,088,836 | Brown | Aug. 3, 1937 |
| 2,543,934 | Poskey | Mar. 6, 1951 |
| 2,580,096 | Holt et al. | Dec. 25, 1951 |
| 2,584,781 | Beatty | Feb. 5, 1952 |
| 2,664,223 | Dobkin | Dec. 29, 1953 |